Figure 1:
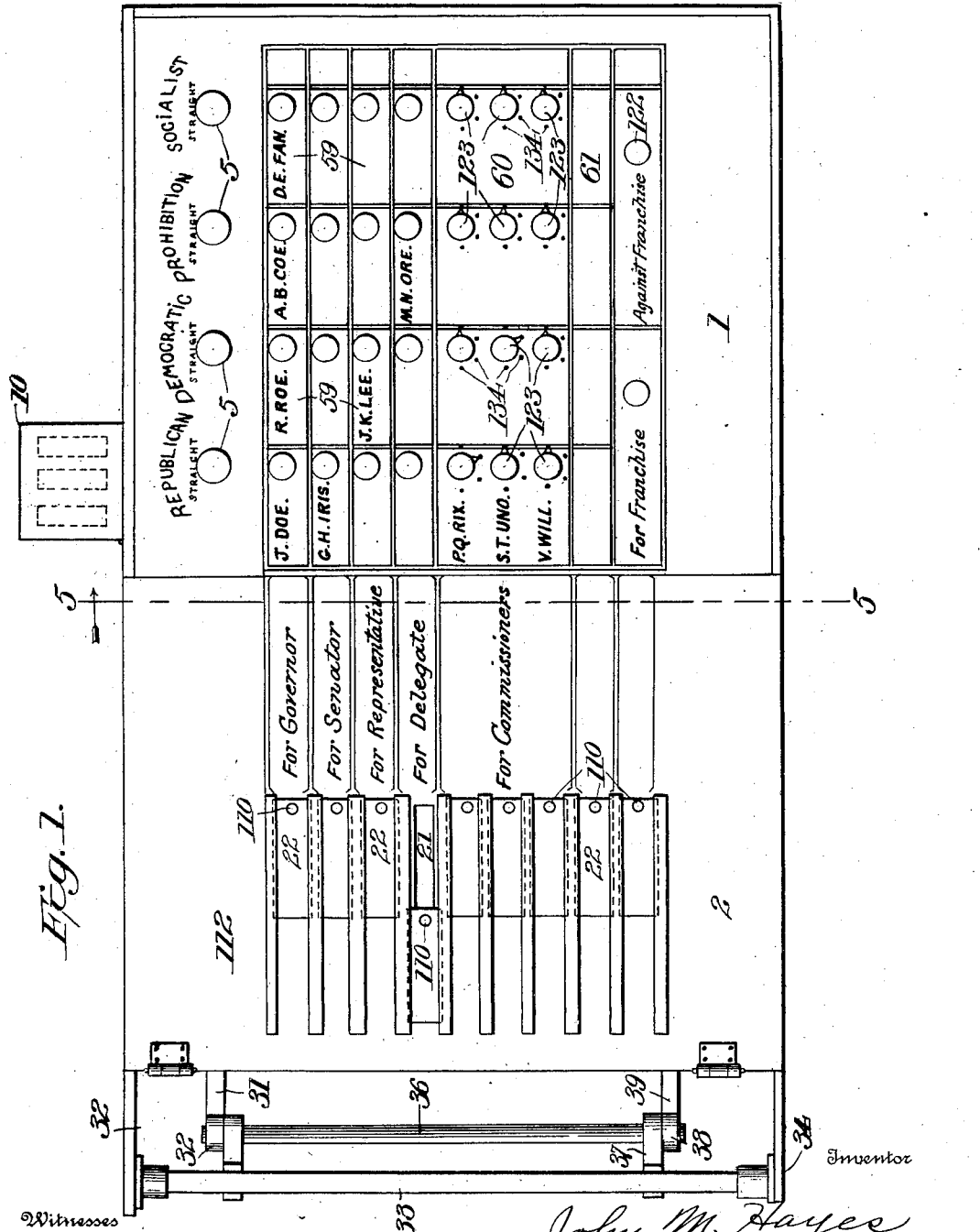

J. M. HAYES.
VOTING MACHINE.
APPLICATION FILED DEC. 4, 1909.
1,098,796.
Patented June 2, 1914.
13 SHEETS—SHEET 5.
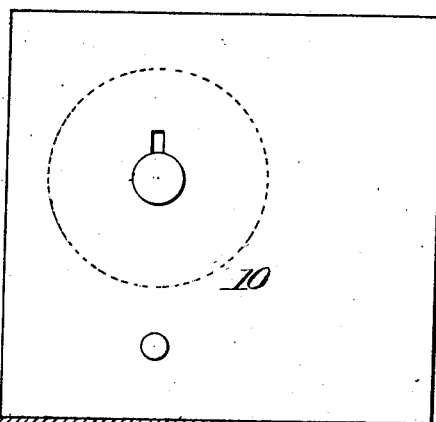
Fig. 5.
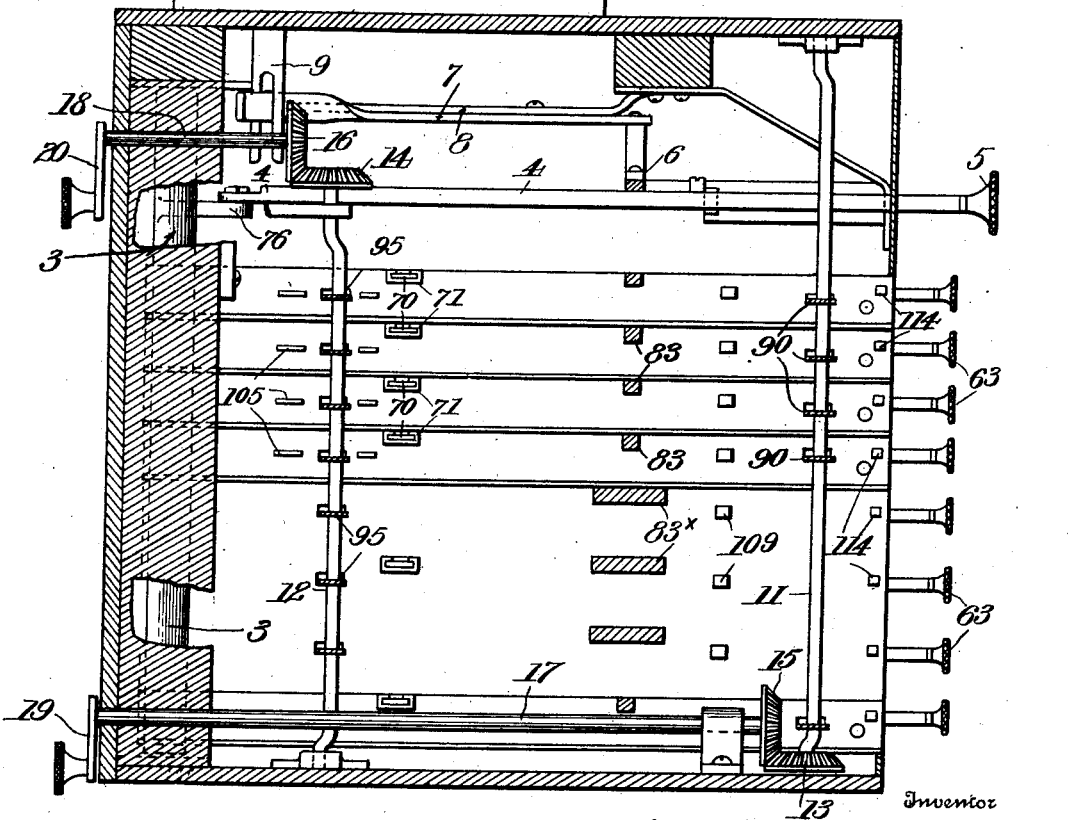
Witnesses
C. H. Walker.
Ernest Hutchinson.
Inventor
John M. Hayes,
By Edson Bro's
Attorneys

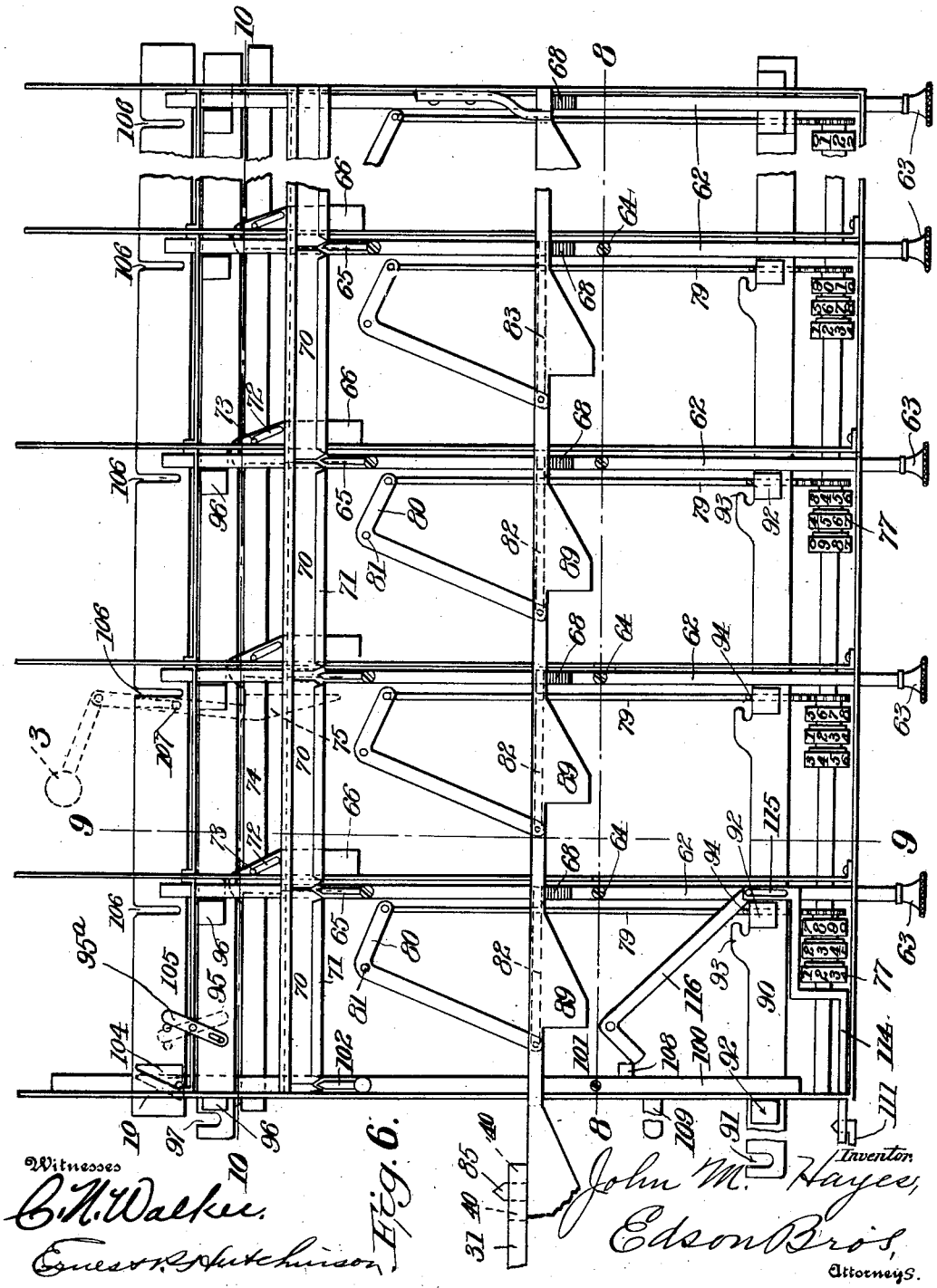

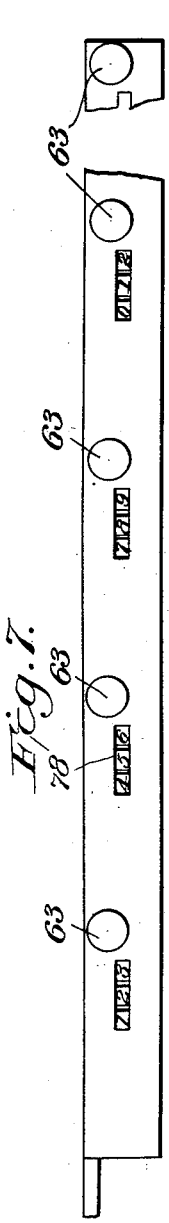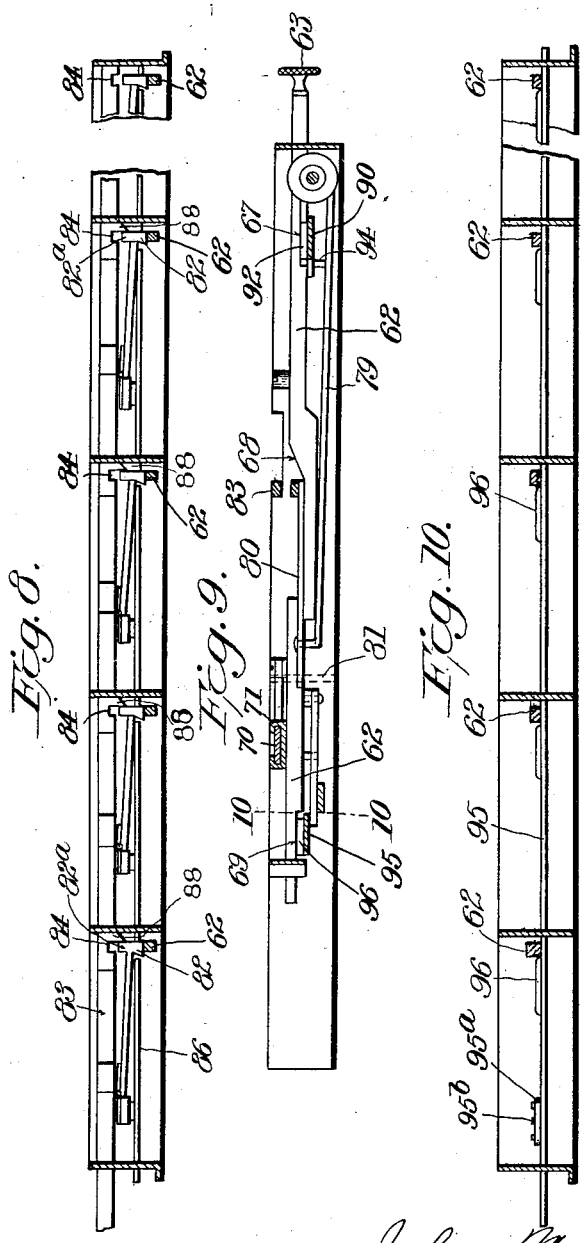
J. M. HAYES.
VOTING MACHINE.
APPLICATION FILED DEC. 4, 1909.
1,098,796.
Patented June 2, 1914.
13 SHEETS—SHEET 7.

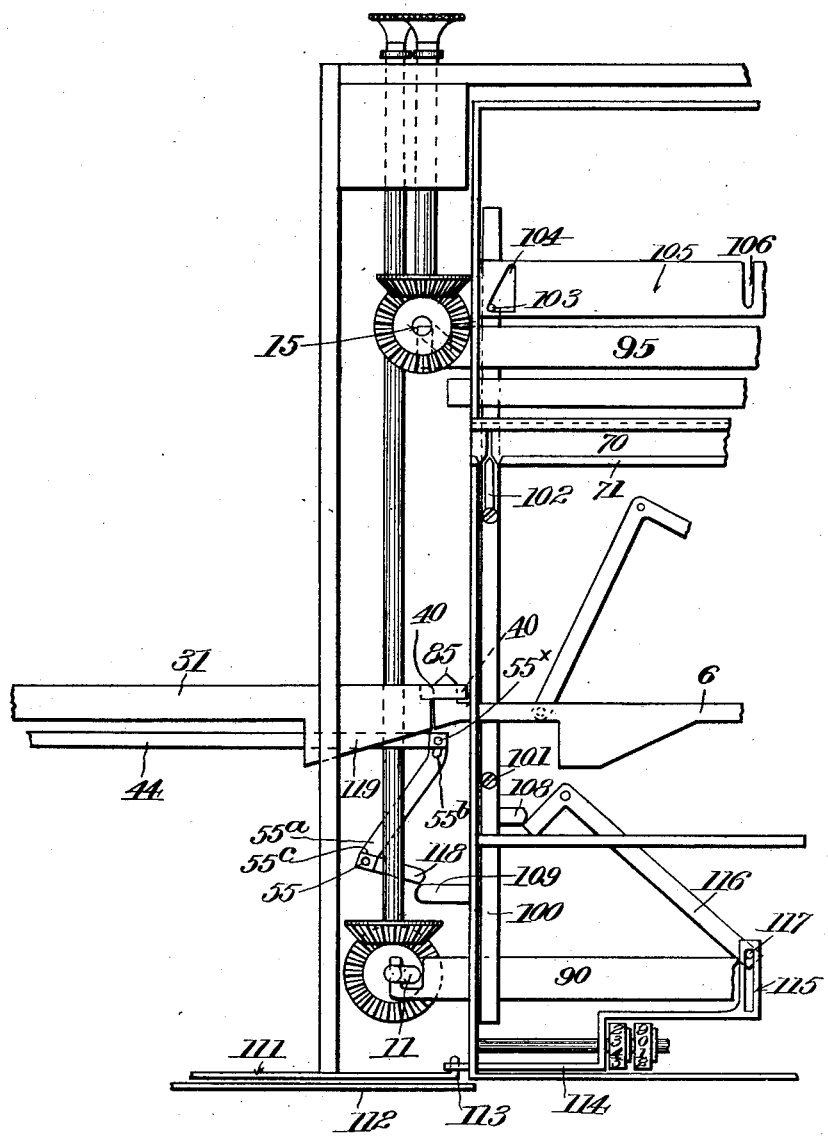

J. M. HAYES.
VOTING MACHINE.
APPLICATION FILED DEC. 4, 1909.
1,098,796. Patented June 2, 1914.
13 SHEETS—SHEET 9.
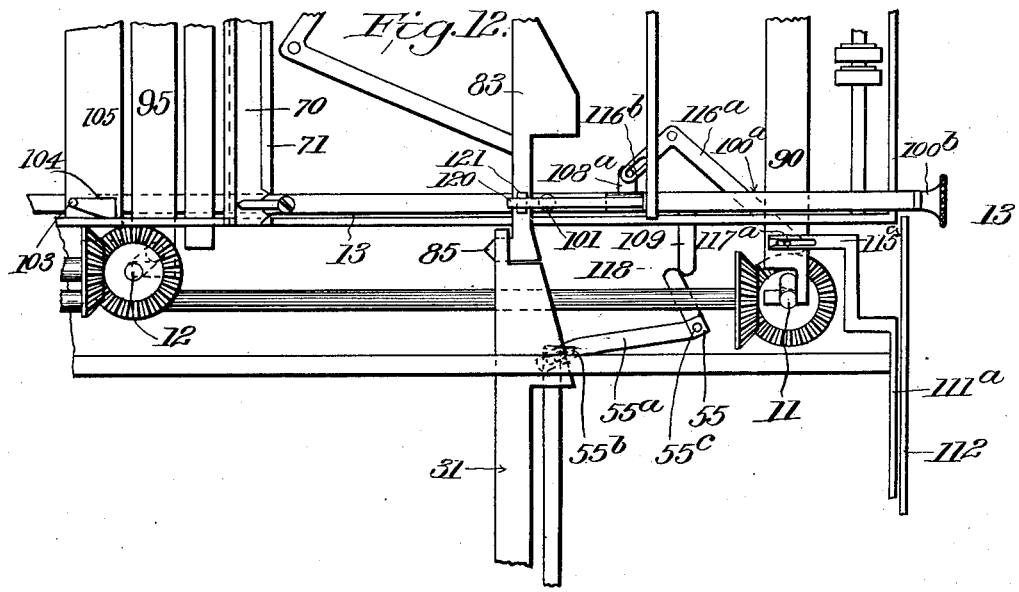
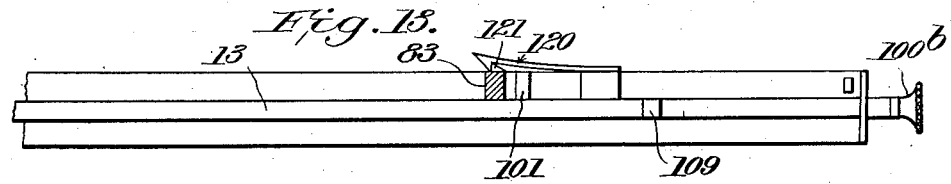
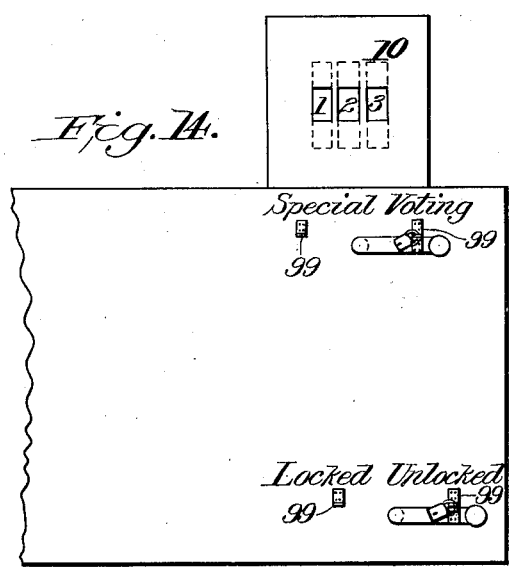
Witnesses
Inventor
John M. Hayes,
By Edson Bro's
Attorneys.

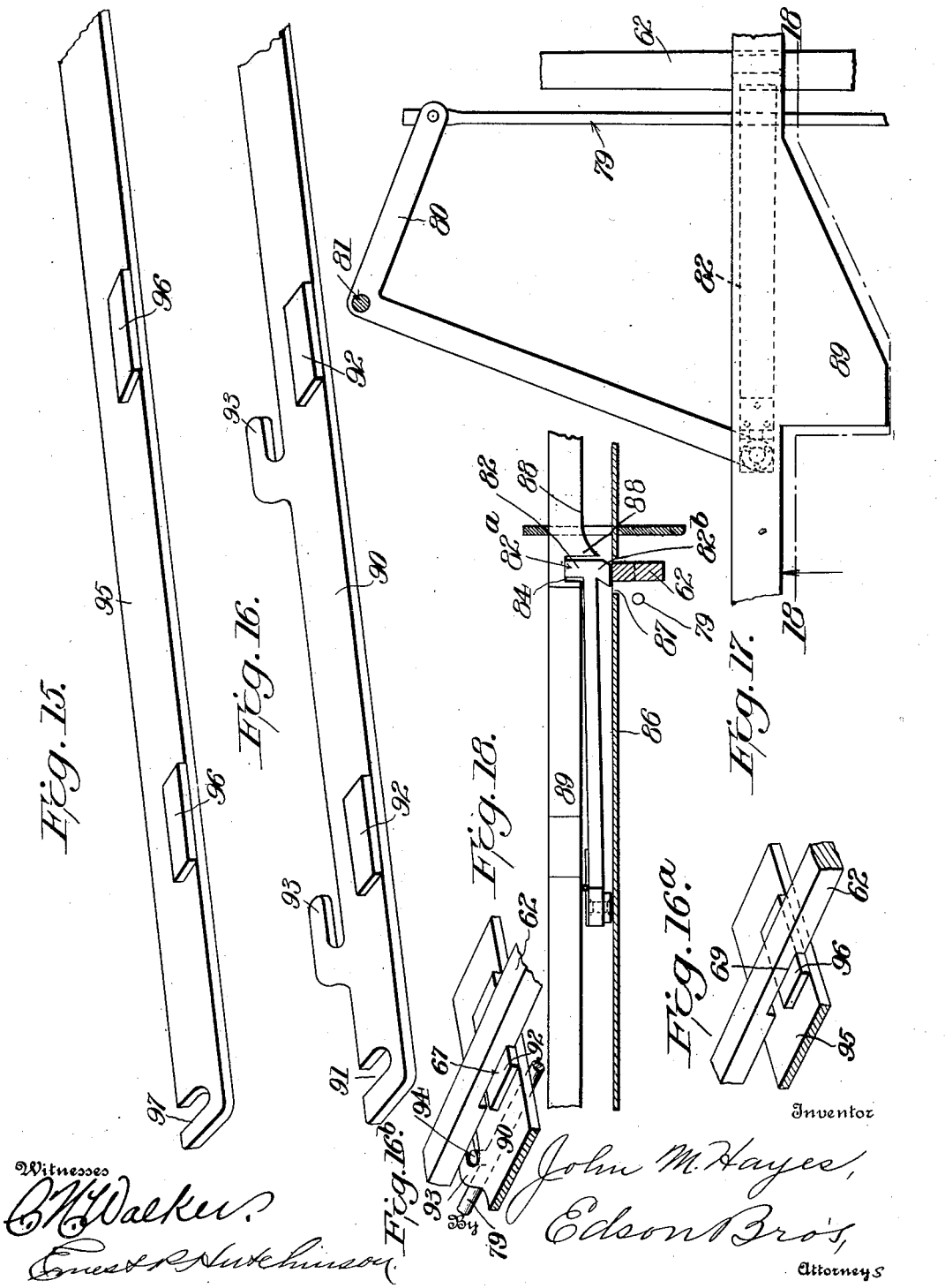

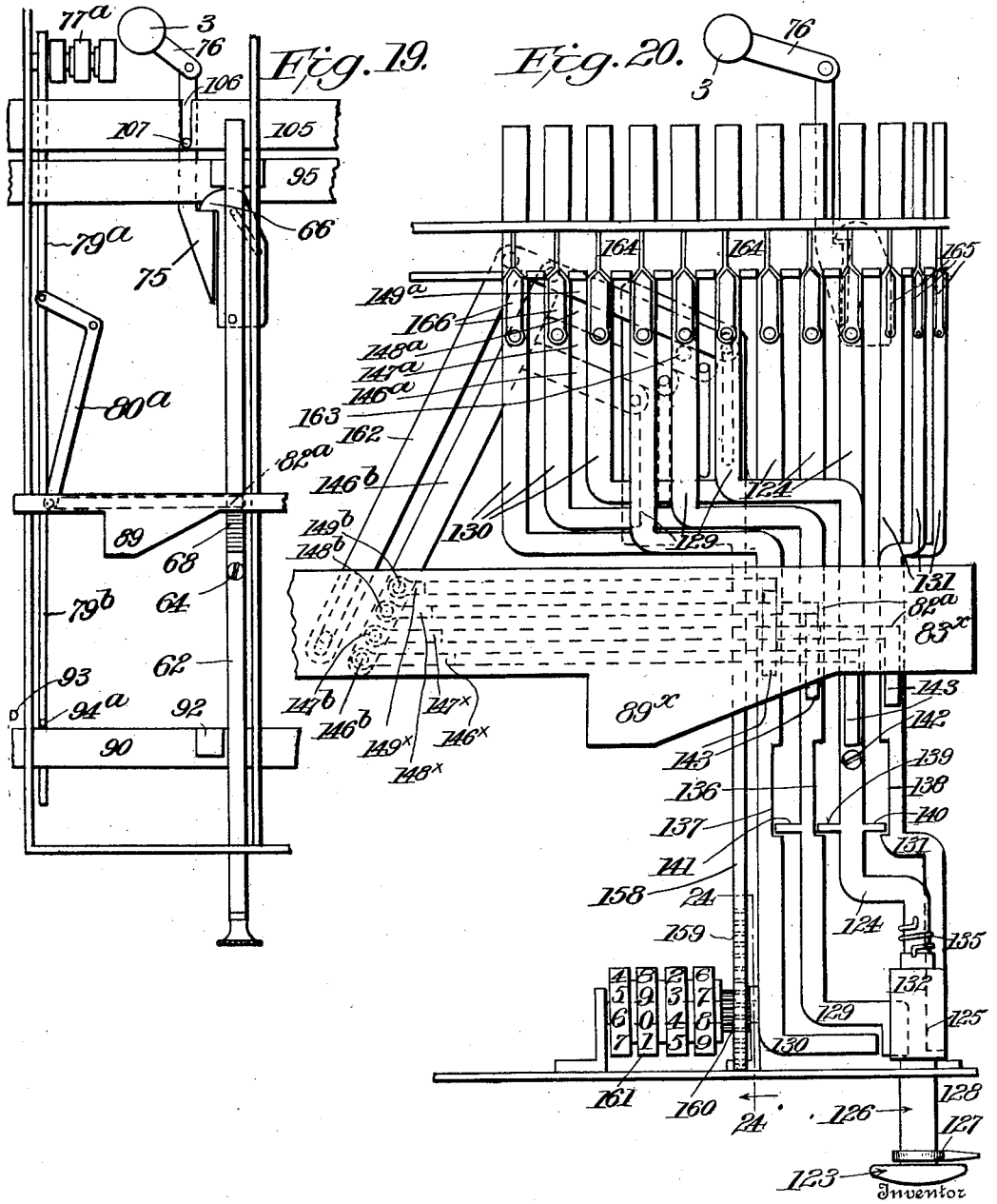

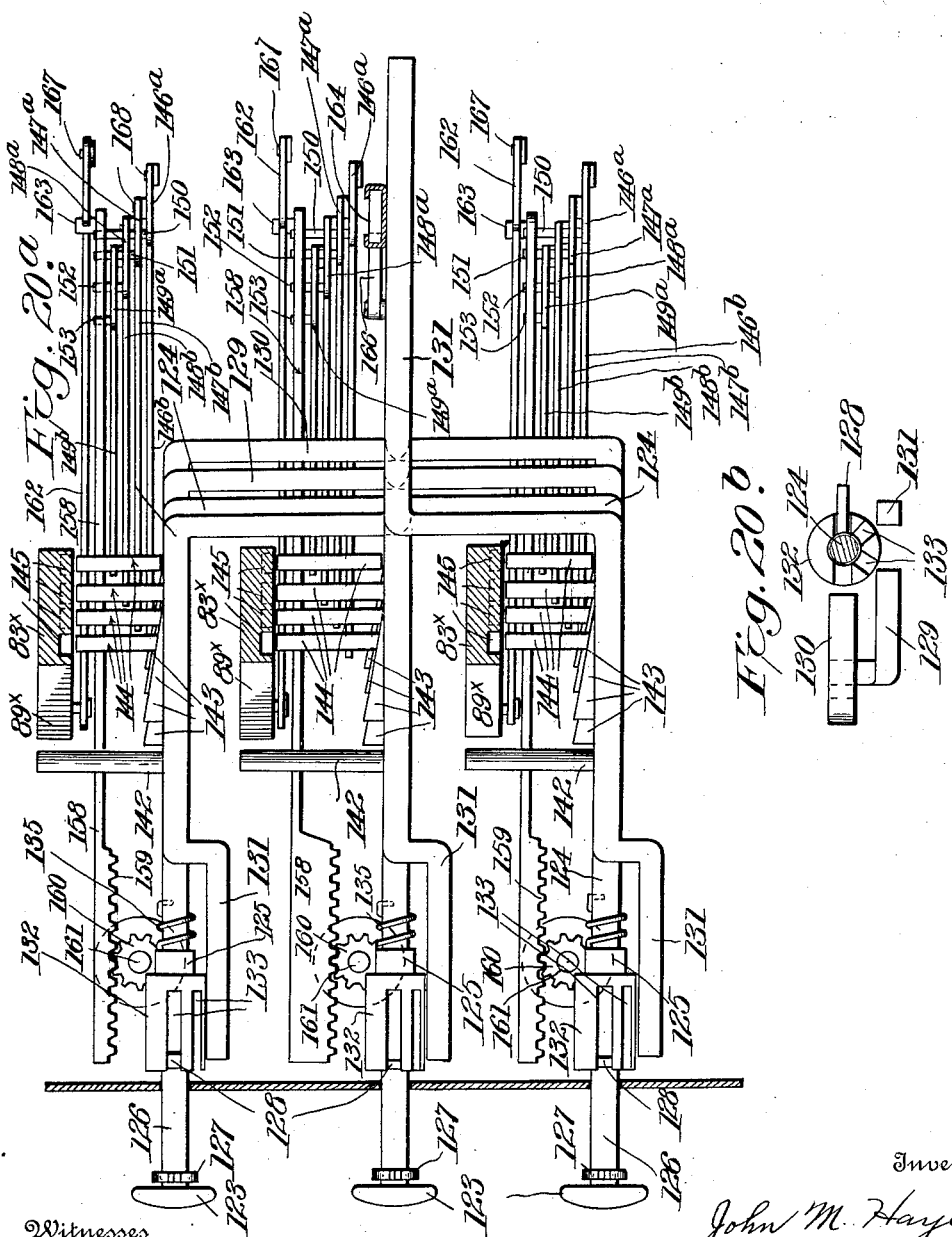

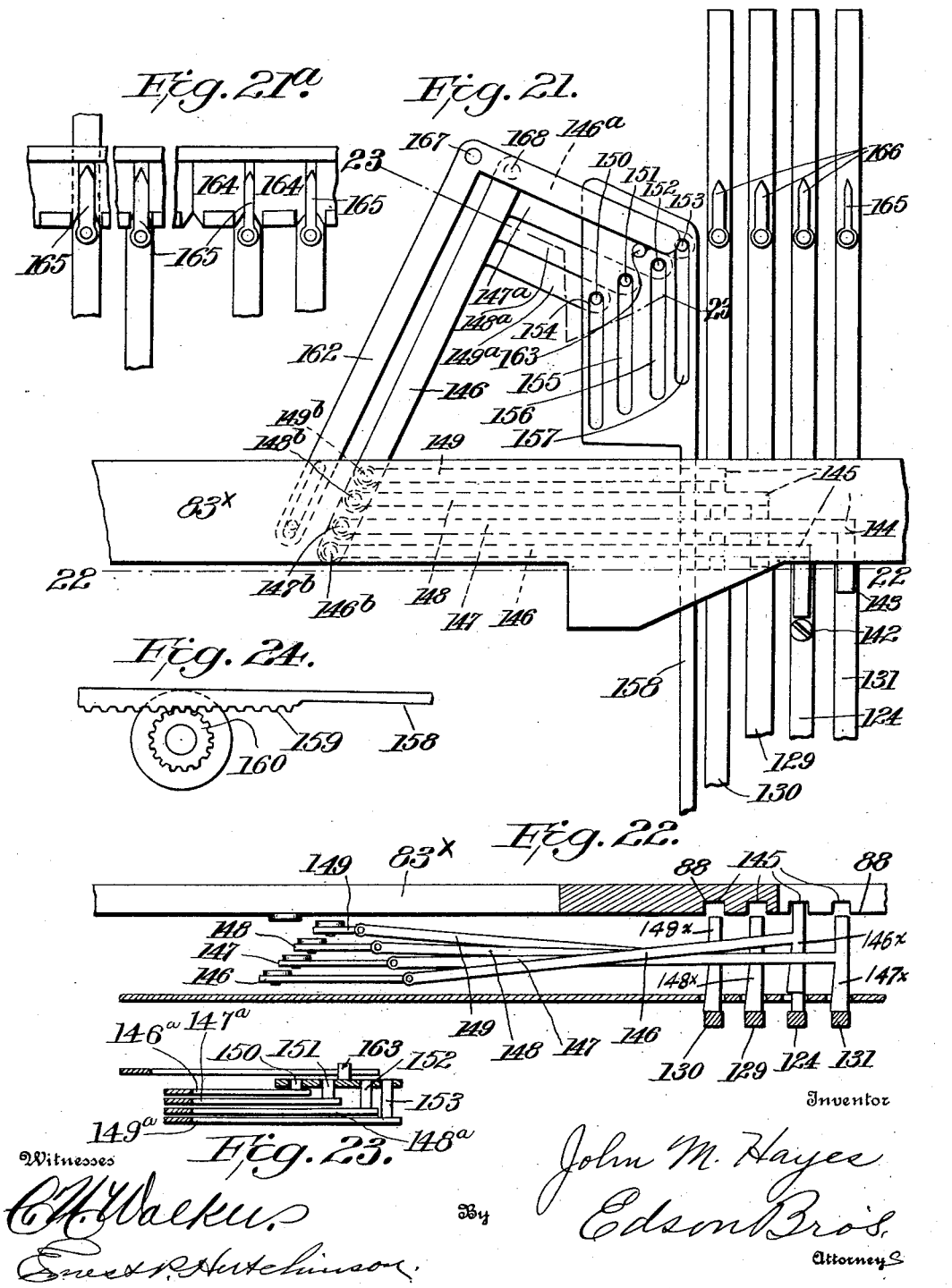

UNITED STATES PATENT OFFICE.

JOHN M. HAYES, OF MONTOURSVILLE, PENNSYLVANIA.

VOTING-MACHINE.

1,098,796.  Specification of Letters Patent.  Patented June 2, 1914.

Application filed December 4, 1909. Serial No. 531,422.

*To all whom it may concern:*

Be it known that I, JOHN M. HAYES, a citizen of the United States, residing at Montoursville, in the county of Lycoming and State of Pennsylvania, have invented certain new and useful Improvements in Voting-Machines; and I do hereby declare the following to be a full, clear, and exact description of the invention, such as will enable others skilled in the art to which it appertains to make and use the same.

My invention relates to voting machines of the type shown and described in the patent to John W. H. Doubler, No. 896,201, dated August 18, 1908, and is especially designed as an improvement on the machine disclosed in this patent.

The principal objects of the present invention are to provide, first, a practical voting machine having removable sections each containing voting apparatus for one or more officials, whereby the machine may be made up to include only the required number of sections for each election; second, a simple, independent voting mechanism which may be used in connection with all offices to be filled; third, improved cumulative voting mechanism capable of dividing votes for three or more candidates for the same office into parts of any numerical value including one and one-half votes for each of two candidates where an election of three for the same office is allowed; fourth, special voting mechanism allowing certain classes of voters to vote for particular officials, but preventing them from voting for any others, such mechanism being so constructed and operated that the machine may be quickly changed from a condition for regular voting to that for special voting, and vice versa, whereby a special voter may follow a regular voter, and a regular voter a special voter, without creating any confusion or interfering with the operation of the machine; fifth, means for locking the entire machine, including the registers, after an election is over, until the appointed time for the official counting of the votes; sixth, apparatus for registering the number of voters who use the machine, said register being placed in full view of the election judges and waiting voters; seventh, improved registering mechanism for counting the votes cast by each voter as he leaves the machine; eighth, means compelling the barrier which controls access to the machine to be fully opened or closed when it is once started in either direction; ninth, improved register actuating mechanism whereby when a voter has indicated his vote and does not withdraw it a connection is made between the door of the booth and the register that must remain until the door has been opened and closed and the register actuated and when the door is closed the register actuating mechanism will be returned to normal position again, and tenth, an improved mechanism for disconnecting the "straight-ticket" mechanism from the individual and independent voting mechanism whereby when any individual vote or independent vote has been cast for any one office the "straight-ticket" mechanism for all the remaining candidates for that office will be disconnected from their respective individual voting mechanism, and when for special voting the locking device is actuated all the "straight-ticket" mechanism connected to offices which are locked will be disconnected from the respective individual voting mechanism without affecting any other part of the "straight-ticket" mechanism and in such a manner as to allow the voter to withdraw his vote, thereby returning the "straight-ticket" mechanism to normal position and also when one vote is cast for an office or several votes for several offices of several different political parties, that after this has been done the use of the "straight-ticket" of any political parties will vote all the remaining offices for the candidates of that political party, making it unnecessary for any instructions to the voter as to how or in what order he should proceed in voting.

Other objects of the invention will become apparent from the following description.

The invention consists in the features of construction and combinations of parts hereinafter described and specified in the claims.

Figure 2:
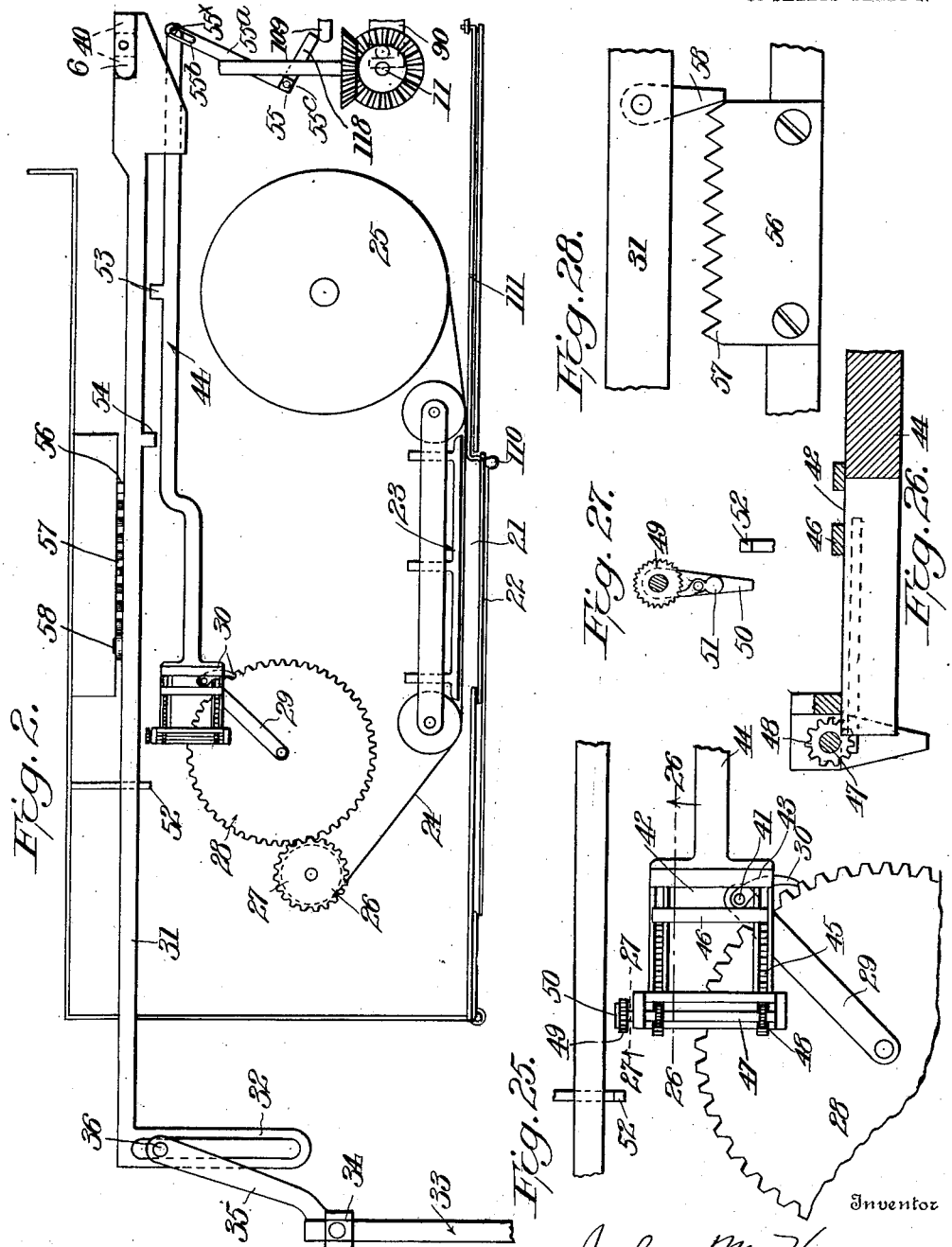
Figure 3:
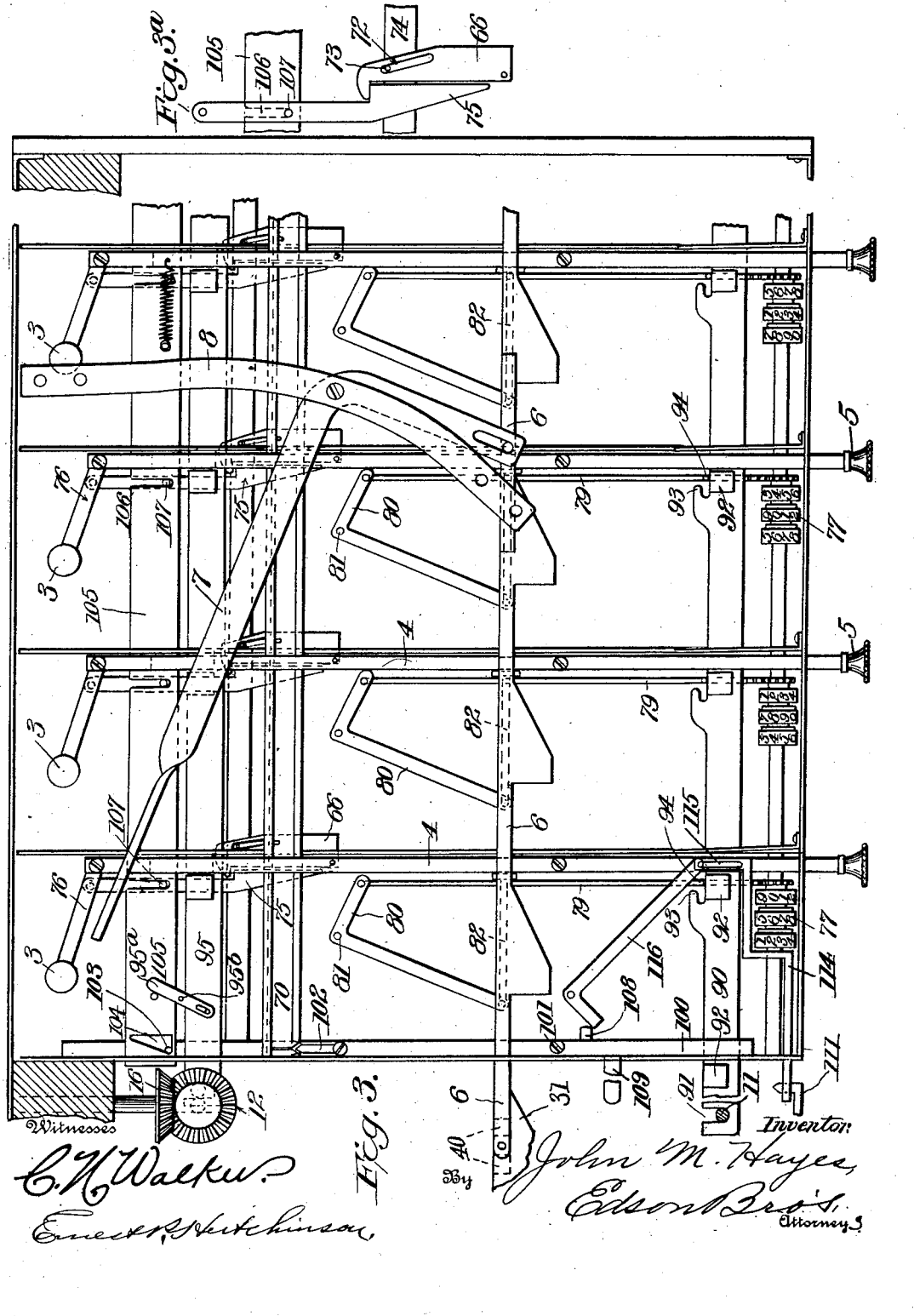
Figure 4:
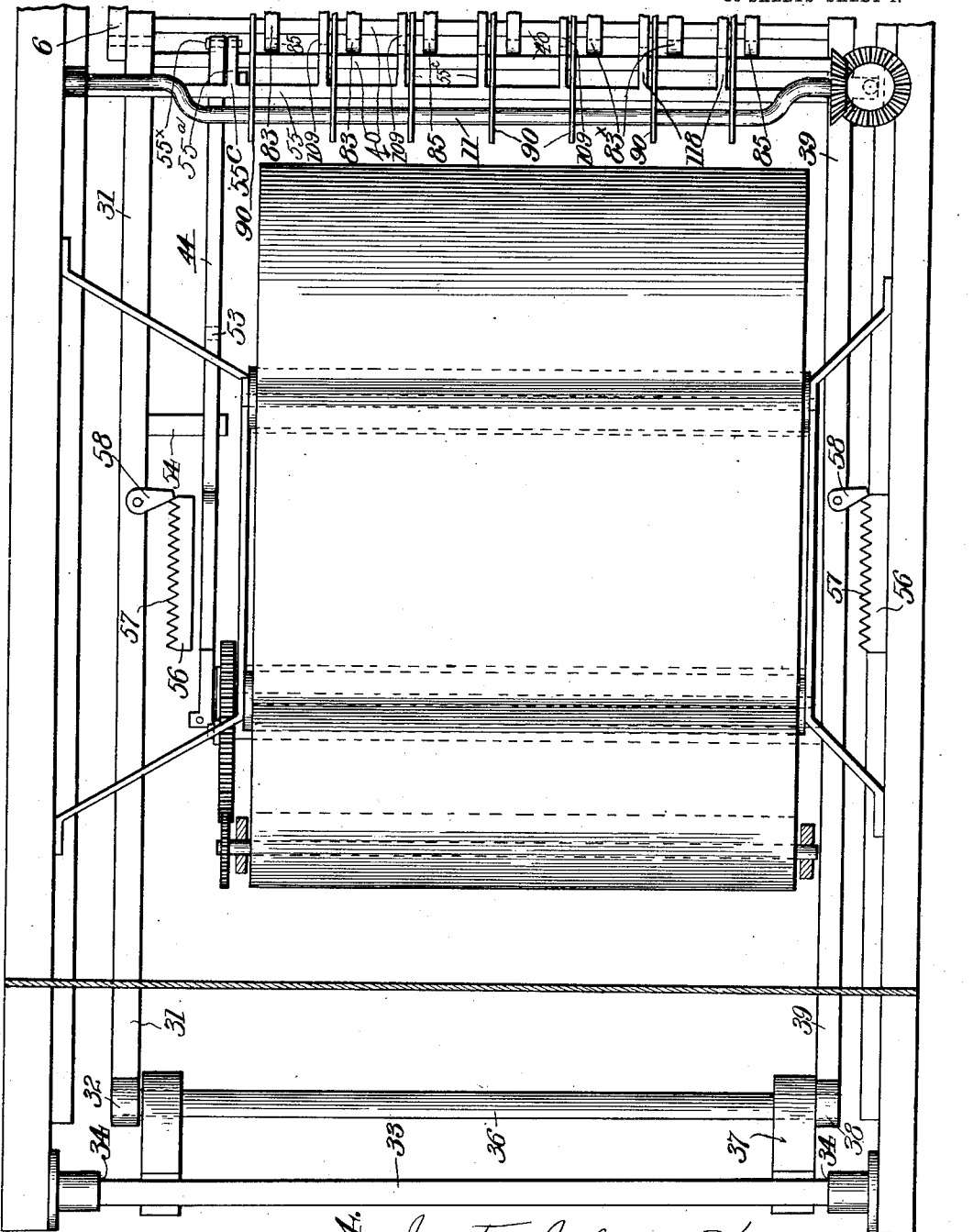

In the accompanying drawings illustrating the preferred embodiments of my invention: Figure 1 is a front elevation of the machine. Figs. 2 and 3 are partial supplemental plan views with the top of the casing removed. Fig. 3ª is a detailed view of one of the hooks which are carried by the voting slides and engage other hooks connected to the "straight ticket" shafts. Fig. 4 is a front elevation of the independent voting mechanism, the front of the casing being removed. Fig. 5 is a cross section on the line 5—5 of Fig. 1. Fig. 6 is a plan view of one of the removable sections equipped for voting for a single official. Fig. 7 is a front view of this section. Fig. 8 is a longitudinal vertical section on the line 8—8 of Fig. 6. Fig. 9 is a cross section on the line 9—9 of Fig. 6. Fig. 10 is a longitudinal vertical section on the line 10—10 of Fig. 6. Fig. 11 is a broken plan view showing the connection between the regular and independent voting mechanisms. Fig. 12 is a similar view illustrating a modified construction of the independent voting apparatus. Fig. 13 is a cross section on the line 13—13 of Fig. 12. Fig. 14 is a broken view of the rear of the machine on a reduced scale. Fig. 15 is a detailed view of one of the locking bars forming part of the special voting mechanism. Fig. 16 is a similar view of one of the locking bars for locking the entire machine. Fig. 16$^a$ is a perspective view showing the locking connection between one of the voting slides and one of the rear locking slides. Fig. 16$^b$ is a similar view showing the locking connection between one of the voting slides and one of the front locking slides. Fig. 17 is a fragmentary detailed view on an enlarged scale to illustrate the connection between the register actuating slide and one of the register actuating levers. Fig. 18 is a section on the line 18—18 of Fig. 17. Fig. 19 is a broken plan view of a modified construction of the regular voting apparatus in which the register is placed at the rear, instead of at the front, of the machine. Fig. 20 is a partial plan view of the section containing the cumulative voting mechanism. Fig. 20$^a$ is a side view thereof. Fig. 20$^b$ is a broken front view with the front of the casing removed. Fig. 21 is a fragmentary plan view of part of the cumulative voting device showing particularly the rear part of the registering mechanism. Fig. 21$^a$ is a detailed view of the means which prevents more than the requisite number of votes being cast for the same office. Fig. 22 is a sectional view on the line 22—22 of Fig. 21. Fig. 23 is a sectional view on the line 23—23 of Fig. 21. Fig. 24 is a detailed sectional view on the line 24—24 of Fig. 20. Fig. 25 is an enlarged detailed view of the compensating mechanism for winding up the paper used for independent voting. Fig. 26 is an enlarged section on the line 26—26 of Fig. 25. Fig. 27 is a detailed view of the swinging lever, pawl and ratchet which operates said compensating mechanism, and, Fig. 28 is an enlarged detailed view of the device which prevents the barrier from being returned to its first position when it has once been started to be opened or closed.

The general type of this machine is similar to that shown and described in Patent, No. 896,200, above referred to, in that the voting slides for the several political parties are arranged in vertical columns with a "straight ticket" slide at the top of each column, while the voting slides for the different candidates for the several offices to be filled at an election are arranged in horizontal rows. It is also like said patented machine in permitting a voter to change his vote, if he desires, before he leaves the machine, and in registering the vote by the opening of the door or barrier as the voter departs.

The present invention, however, contemplates the construction of that part of the machine used for regular voting in sections which are removable from the main framework so that dummy sections may be inserted in place of any which are not required to be used at a given election. The main framework comprises a right hand section equipped for regular voting, and a left hand section of less depth than the right hand section and carrying the independent voting mechanism. Both sections are of the same height which should be sufficient to include all voting mechanism required for the election of the maximum number of officials ever chosen at a single election in the district where the machine is to be operated.

The right hand section 1 is illustrated particularly in Figs. 1, 3 and 5, and the left hand section in Figs. 1, 2 and 4. The rigid part of the right hand section 1 of the framework contains the upright shafts 3 for the purpose of voting "straight tickets", and the horizontal voting slides 4, each connected to one of said shafts 3 and extending through the front of the machine where they are provided with push buttons 5. Referring more particularly to Fig. 5, this rigid framework also contains a registering slide 6 and a horizontal lever 7 pivoted to a bracket 8 and connected at one end to said registering slide and at the other end to the depending operating arm 9 of the register 10 which counts the number of voters, the register members appearing on another face of the register, as shown in Fig. 14. Said rigid framework is further provided with two upright crooked or eccentric shafts 11 and 12 arranged at the side adjacent to the left hand section 2. One of these crooked shafts 11 is located near the front of the machine, while the other 12 is arranged near the back thereof. Each carries a beveled pinion 13 and 14, respectively, meshing with another pinion 15 and 16 on horizontal shafts 17 and 18 running to the back of the machine where they are equipped with cranks 19 and 20 for the purposes which will be hereinafter explained. The removable sections containing the regular voting apparatus and which are slipped into the rigid framework will also be described later.

The left hand section 2 is provided with a column of slots 21 in its front face, each of which is normally covered by a plate 22. Within these slots and extending the full height of the column is arranged a table 23 over which a strip of paper 24 passes from a roll 25 to another roll 26. The latter roll carries a gear wheel 27 meshing with a larger gear wheel 28 on the axle of which is also mounted a swinging arm 29 carrying a pawl 30, see Figs. 2 and 25. A registering slide 31 passes through the upper part of the section 2 and is connected in any suitable manner to the registering slide 6 passing through the upper part of section 1 for the purpose of returning the "straight-ticket" shafts to normal position. These slides 31 and 6 do not actually register the votes but are designated "registering slides" because they are constructed and operated like the registering slides in the removable sections hereinafter described. Said slide 31 is provided with a slotted bracket 32 on its end which projects beyond the framework of the machine, see Fig. 2. The barrier 33 is pivoted at 34 (Figs. 1, 2 and 4) and has a rigid arm 35 carrying a pin 36 fitted in the slot of said bracket 32. As illustrated in Fig. 4, the barrier also has another arm 37 similar to the arm 35, but arranged at its lower end. The latter arm is connected in a like manner to the slotted bracket 38, similar to bracket 32 of Fig. 2, on a slide 39, see Fig. 4. The slides 31 and 39 terminate at a point near the juncture of the sections 1 and 2 of the machine and their ends are connected to the ends of two parallel spaced-apart uprights 40. The arm 29 is pivoted at one end to the center shaft of the wheel 28, Figs. 2, 4 and 25.

The free end of the arm 29, Figs. 2 and 25 carries a projecting pin 41 arranged in a slot 42 in a frame 43 at the end of a horizontal slide 44. Said frame is equipped with two rack bars 45, the ends of each are connected to a cross bar 46 forming one side of the slot 42. Said frame is also provided with a cross shaft 47 carrying pinions 48 meshing with the rack bars 45, and a ratchet gear 49 and a loose gravity arm 50 on its rear end. The gravity arm 50 carries a gravity pawl 51 (see Fig. 27) which engages the ratchet pinion 49. This gravity arm is adapted to contact with a fixed pin 52 during each reciprocation of the frame 45 which causes the shaft 47 to revolve to a certain degree thereby moving the rack bars 45 and the cross bar 46 carried by them, with the result that the slot 42 is enlarged and the throw of the arm correspondingly shortened after each reciprocation of said frame. The purpose of this mechanism is to compensate for the increase in diameter of the roll 26 as the paper becomes wound thereon from the roll 25 so that the registration of each independent vote will always move the same amount of paper across the table 23 behind the slots 21. On the slide 44 there is a projecting lug 53 arranged in the path of a projection 54 on the registering slide 31 whereby the longitudinal movement of said slide 44 and the winding of the paper upon the roll 26 is effected by the movement of said registering slide, which in turn is operated by the opening of the door or barrier. The slide 44 is connected by a link 55ª to an upright 55 arranged near the juncture of the left hand section 2 with the right hand section 1 of the machine. Said link has pin and slot connection, as at 55ᵇ 55ˣ with the slide 44 but is rigidly connected at 55ᶜ to the upright 55. Mechanism is connected to this upright, as will be hereinafter described, for moving the slide 44 into operative position each time that one of the plates 22 is moved so as to uncover its slot 21.

Referring to Figs. 2 and 28, 56 designates a plate secured to the frame of the machine and serrated, as at 57, on its upper edge, preferably like saw teeth. The registering slide 31 carries a swinging gravity dog 58 which plays back and forth from one end to the other of said plate 56 during each reciprocation of said registering slide. The length of said dog is such that when the registering shaft starts to move in one direction, it will be engaged by the serrations or teeth on the edge of said plate 56 and prevent said slide from returning to its initial position until it has reached the end of its stroke. This device prevents the door from being closed after it has once been pushed partly open until it has been fully opened, and vice versa.

I have illustrated the machine as containing several removable sections 59 each containing apparatus for voting for a single official, and one section 60 equipped for cumulative voting where three officials are to be elected for the same office. It will be understood that the arrangement of these sections shown may be changed so that more of the "single vote" sections may be employed or more than one cumulative voting section used, if desired. Wherever the voting section is not required, a dummy section may be substituted, as at 61, in Fig. 1.

Each of the "single vote" sections, as illustrated particularly in Figs. 6 to 10, inclusive, contains a plurality of voting slides 62 extending through the front thereof where they are provided with push buttons 63. Each voting slide carries an upwardly projecting lug 64, a wedge 65 and a hook 66, said lug, wedge and hook being arranged on the upper face of the slide while said hook is pivoted to its upper face. Said voting slide is also provided with a notch 67 in its under face near the front end thereof, (see Fig. 9), an inclined step 68 on its upper face intermediate thereof, and a notch 69 in its under face near the rear end thereof. The wedges 65 carried by the several voting slides are adapted to pass between adjacent spacing blocks 70 when said voting slides are pushed in by pressing the buttons 63. Said blocks are carried by a channeled bar 71 extending longitudinally of the section. Only sufficient space is left between these blocks to allow one of the wedges to enter whereupon the spaces will be entirely closed preventing any one of the other voting slides from being pushed in. This arrangement of the wedges and spacing blocks is similar to that shown in the Doubler patent hereinbefore referred to, and is designed to prevent a voter from casting more than one vote for each official where only one is to be elected.

Each of the hooks 66, Figs. 3, 3ª, 6 and 19, carried by the voting slides has a slot 72 therein arranged obliquely to the axis of its slide and extending forwardly and to the right thereof. These slots are engaged by pins 73 mounted on a longitudinal bar 74, rigidly fastened to the frame of the section. When the section is inserted into the machine, the hooks 66 slip into engagement with oppositely extending hooks 75 pivotally connected to arms 76 rigidly fastened to the "straight-ticket" shafts 3, one of which is shown in Fig. 6 and the ends of each of these shafts are shown in Fig. 3. It will be noted that the operation of pushing in one of the voting slides will throw the "straight-ticket" hooks 75 connected to all the other "straight-ticket" shafts out of connection with the corresponding individual voting hooks 66 of the section in which the vote was cast by reason of the inclined slots 72 and the pins 73 carried by the rigid bar 74. The result is that a voter after casting a vote for the candidate of one political party for a particular office may vote for the candidates of another political party for all the other offices by pressing the "straight-ticket" slide of the latter party. Registers 77, one for each voting slide, are arranged near the front of the section and may be viewed through the slot 78 in the front face thereof, as shown in Fig. 7. Each of these registers is actuated by any suitable mechanism, such as a rod 79, having a rack at one end meshing with a pinion connected by a ratchet to the register. The other end of the rod 79 is attached to one end of a registering lever 80 intermediately pivoted, as at 81, to a fixed part of the section. To the other end of this lever is hinged a hammer-shaped dog or hook 82 (see Figs. 8, 17 and 18). Said dogs are arranged below and in alinement with the registering slide 83 which has notches 84, one corresponding to each of said dogs. The upwardly projecting portion 82ª of each dog will be engaged with the corresponding notch 84 in the registering slide when its voting slide is pushed in, by reason of the downwardly extending portion 82ᵇ of said dog, which rests upon said voting slide, riding up the inclined step 68 of the voting slide.

The registering slide 83 has a hook 85 (see Figs. 4, 6 and 12) on its end which fits into the slot formed between the two uprights 40 arranged between the slides 31 and 39 connected to the door so that when the door is opened, said registering slide 83 will be moved longitudinally from left to right. It will be readily understood that when said registering slide moves, it will carry with it the one of the dogs 82 which has been brought into engagement with its notch 84 by having its voting slide pushed in and that the movement of said dog with the registering slide will actuate the register, corresponding with the pushed in voting slide, through the lever 80 and rod 79, said rod being moved longitudinally in a rearward direction to accomplish this registering operation. Any suitable connection between the rod 79 and the register may be employed, for instance, the arrangement illustrated in Figs. 20 and 24. A supporting strip 86 (Figs. 8 and 18) serves to support the hammer-shaped dog after it is moved off its voting slide and until it is returned to normal position. This strip is slotted, as at 87, to allow the downwardly projecting portion of the dog to drop through it and rest upon its voting slide when returned to normal position, and with the upwardly extending portion of said dog out of engagement with the notch 84 in the registering slide. Said registering slide has downward extensions 88 at the right hand sides of the notches 84 to engage the dogs 82 and insure their return to normal position after they have been moved by said registering slide for actuating the registers. The registering slides 6 and 83 are also provided with cam-shaped forward projections 89 which engage the lugs 64 on the upper faces of the voting slides and return said slides to their normal positions, if they have been pushed in, when said registering slide is reciprocated. It will thus be seen that the movements of the registering slide, which is caused by the opening of the door will simultaneously register the votes which have been cast by pushing in the voting slides and returning said voting slides to their normal position. It will also be noted that only those registers will be actuated whose voting slides have been pushed in and remain pushed in because only those of the hammer-shaped dogs 84, corresponding with the pushed in voting slides, will be raised into engagement with the notches in said registering slide.

The registers may be arranged at the back instead of at the front of the section, if desired, as at 77ª in Fig. 19. The register-actuating levers 80ª, in this case, are connected to rearwardly extending rods 79ª, which has a forward extension 79ᵇ having a pin 94ᵇ mounted thereon for engagement by the hook 93 Fig. 6 when the locking slide 90 is actuated. The actuation of this modified construction is substantially the same as where the registers are placed at the front of the machine.

Referring more particularly to Figs. 3 and 6, a single longitudinal slide 90 is arranged in each of the single vote sections near the front thereof, and its end next to the independent voting mechanism slotted, as at 91, to engage the crooked upright shaft 11 when the said section is inserted into the machine. The slides 90 of the several sections contained in the machine all engage the shaft 11 in the same way as illustrated in Figs. 4, 5 and 11. Said slide 90 has blocks 92 on its upper face adapted to engage the notches 67 in the voting slides when said slide 90 is moved from left to right by the rotation of said crooked shaft 11 (of Fig. 5). Said slide 90 also has rearwardly extending hooks 93 which engage pins 94 on the register actuating rods 79 when this slide is moved to bring its blocks into engagement with the notches in the voting slides, whereby said registers and voting slides are positively locked until the slide 90 is moved back to its normal position. The crooked shaft 11 which actuates the slide 90 is itself operated by the crank 19 mounted on the shaft 17, on the outside of the machine, as shown in Figs. 5 and 14. A half revolution of this crank is sufficient to move the slide 70 into or out of locking position. Another locking slide 95 (Fig. 6) is arranged longitudinally of the section near the back thereof and carries blocks 96 adapted to engage the notches 69 in the voting slides. This locking slide also projects from the section toward the independent voting mechanism and said end is slotted, as at 97, see Figs. 5, 6 and 15, to engage the crooked shaft 12 which is revolved by means of the crank 20 mounted on the horizontal shaft 18 on the outside of the machine. A half revolution of this crank in one direction will move the slide 95 so as to bring its blocks 96 into engagement with the notches 69 in the voting slides thereby locking said voting slides against being operated, while a half revolution of said crank in the opposite direction will disengage said blocks from said notches and unlock said voting slides. This locking mechanism is designed for special voting. Before the machine is put into operation for an election, slides 95 should be placed in those of the removable sections containing voting mechanism for officials for which the special voters are not permitted to vote, said slides 95 being omitted from the sections containing the voting mechanism relating to officials for which the special voters are permitted to vote. When a special voter appears, all the judge of election need do is to turn the crank 20 a half revolution to place the machine in a condition so that the special voters can only vote for the officials for whom the statute permits him to vote. If the next voter is a regular voter, the machine can be immediately placed in condition for him to vote for all the officials by merely turning the crank 20 back to its initial position. Both of the cranks 19 and 20 may be locked in either of their positions by pad-locks 98, or any other suitable device for fastening said cranks to the brackets 99 forming stops for said cranks.

Each of the "single vote" removable sections contains in addition to the regular voting slides an independent voting slide 100, see Fig. 11, as well as Figs. 3 and 6. This slide is arranged parallel to the other voting slides and, like them, carries an upwardly projecting lug 101 on its upper face, and a wedge 102, the latter adapted to pass between the spacing blocks 70 with the same effect as the wedges carried by each of the voting slides 62. Said slide 100 also has a pin 103 on its upper face engaging a triangular slot 104 in a strip or movable bar 105 arranged longitudinally of the section just behind the locking bar 95. This slot extends rearwardly and to the right of the pin 103 so that when the slide 100 is moved in, it will cause the bar 105 to move from right to left. Said bar is provided with open-ended slots 106, see Figs. 3 and 6, which engage with pins 107 on the hooks 75 carried by the "straight ticket" shafts 3 see Figs. 3 and 5, when the removable section is slipped into place in the frame of the machine. All of the hooks 75 will, therefore, be disengaged from the hooks 66 carried by the regular voting slides, when the bar 105 is moved from right to left by the inward movement of the slide 100 so that if one of the "straight ticket" slides is subsequently actuated, it will not carry in any of the voting slides arranged in this particular removable section. The movable bar 105 is connected to the locking bar 95 by an intermediately pivoted lever 95ª whereby said bar 105 will be moved from right to left when said bar 95 is moved into locking position, with the result that all the hooks 66 connected to the individual voting slides in the locked section will be disengaged from the "straight ticket" shaft permitting the special voter to use the "straight ticket" slides in the same manner as a regular voter. It will be noted that the broad end of the triangular slot 104 allows the bar 105 to slide as just described and that each time one of the special locking bars 95 is brought into locking position the corresponding individual voting devices are disconnected from the "straight ticket" mechanism reducing by one the number of said individual voting devices which will be actuated by said "straight ticket" mechanism. The independent voting slide 100 is also provided with laterally extending lugs 108 and 109, the former on the right side, and the latter on the left side thereof. Each of the cover plates 22 for the slots in the front of the left hand section of the machine has a knob or handle 110 whereby it may be moved back and forth so as to cover or uncover its slot. A rod 111 (Figs. 2 and 11) is connected to each of said cover plates and extends horizontally to the edge of the front 112 of the left hand section of the machine. Said front 112 is hinged at its left hand edge, as shown in Fig. 1, whereby it may be swung open to obtain access to the paper rolls and other apparatus contained in said section. The end of the rod 111 is hook-shaped, as at 113, (Fig. 11) and, when the hinged front is closed, engages one end of another rod or slide 114 carried by the "single vote" removable section. The rod or slide 114 is preferably crooked to pass out of the way of the adjacent register and is provided with a rearwardly extending slotted terminal portion 115 at its other end see Figs. 3, 6 and 11. An angle lever 116 (Figs. 3 and 11) is intermediately pivoted to the removable section and carries a pin 117 on one end engaging the slot in said terminal portion 115 of the rod 114. The other end of said lever loosely engages the lug 108 on the right side of the independent voting slide 100. By reason of this arrangement of the device, the movement of the cover plate 22 from right to left to uncover its slot 21 will cause the slides 100 to be depressed or moved rearwardly.

The upright 55 (see Figs. 2, 4 and 11) is equipped with rigid horizontal projections 118, one of which extends into the path of each of the lugs 109 on the left side of the slides 100. It will be noted that when said slide 100 is moved rearward, which is accomplished by uncovering the corresponding slot 21, as just explained, the lug 109 acting upon the projection 118 will cause the slide 44 to move from right to left by reason of the links 55ᵃ connecting said upright 55 and said slide 44. This movement of the slide 44 brings the pawl 30 on the arm 29 in position to turn the gear wheel 28 part of a revolution when said slide 44 is moved back again to its initial position. This return movement of the slide 44 is accomplished by the lug 54 on the registering slide 31 engaging the lug 53 on said slide 44 when the door or barrier is opened, said lug 53 having been brought up near to the lug 54 by the movement of said latter slide from right to left. The return movement of the slide 44 also operates to return the voting slide 100 to normal position by reason of the projection 118 engaging the lug 109, and the return of the slide 100 closes the slot 21 in the front 112 of the machine by reason of the lug 108 engaging the lever 116. A cam-shaped lug 119 (Fig. 11) is formed on the registering slide 31 to engage the pin 101 on the slide 100 to insure the return of the latter to normal position when said slide 31 is moved from left to right by the opening of the door or barrier. It will be noted from the foregoing explanation that if one of the regular voting slides has been pushed in or voted, it will close the spacing block 70 so that the wedge 102 carrying the independent voting slide 100 cannot enter between said spacing blocks which has the effect of locking the corresponding cover plate 22 from being moved to uncover its slot 21. In other words, the casting of a vote for a regular nominee will preclude the voter from also voting for an independent candidate for the same office.

In Fig. 12, I have illustrated a modified arrangement for voting for an independent candidate, consisting in extending the independent voting slide 100ᵃ through the front of the removable section and fitting it with a push button 100ᵇ similar to the push buttons on the regular voting slides. In this construction, the handles on the cover plates 22 should be dispensed with and the rods 111 and 114 of the embodiment of the invention illustrated in Fig. 11 are replaced by a single rod 111ᵃ which has a rearward slotted extension 115ᵃ. The slot in said extension is open at its rear end so that it may engage the pin 117ᵃ on the lever 116ᵃ when the front 112 of the left hand section of the machine is closed. Said lever 116ᵃ has positive pin and slot connection, as at 116ᵇ, with the lug 108ᵃ on the right side of the slide 100ᵃ. This positive connection is made so that the lever 116ᵃ may move with the voting slide 100ᵃ in both directions. In order to prevent the withdrawal of the slide 100ᵃ after it has once been pushed in, thereby allowing a vote to be cast for an independent candidate, a spring hook 120 (see also Fig. 13) is secured to said slide 100ᵃ and is adapted to snap into engagement with a stop or lug 121 on the registering slide 83. If some means for preventing the withdrawal of said voting slide were not provided, a voter could vote for an independent candidate and afterward vote for one of the regular nominees for the same office, as the withdrawal of said slide would remove its wedge from between the spacing blocks and permit one of the regular voting slides to be pushed in. When the registering slides 31 and 83 are moved by the opening of the barrier, the stop or projection 121 will be disengaged or moved from beneath the hook 120 thereby allowing the voting slide 100ª to be returned to normal position as described in connection with the showing in Fig. 11.

One or more removable sections 22 (Fig. 1) for voting for or against questions may be used in the machine, if desired in any of the places provided for individual sections. Only two voting slides are required in each of these sections and said voting slides should not be attached to the "straight ticket" shafts. Otherwise, the question voting section may be constructed similarly to the regular voting sections, in so far as the registering of the votes the return of the voting slides to normal position and the locking of the special voting mechanism, etc., are concerned. It is, therefore, deemed unnecessary to specifically illustrate one of these question voting sections.

Referring now to Figs. 20 to 24, inclusive, of the drawings, the push button 123 provided for each candidate for the office to which three officials are to be elected, is connected to a shank 126 in turn connected to the voting slide 124 by means of a collar 125 rigidly secured to said shank, but adapted to rotate on said slide. Said shank 126 carries a pointer or indicator 127 on the outside of the machine and on the inside thereof a projecting lug 128 arranged in alinement with the indicator. Three other voting slides 129, 130 and 131 are grouped around the voting slide 124 and have their ends extending into juxtaposition to the latter slide immediately behind the plane of rotation of the projecting lug 128. The terminals of said slides 129, 130 and 131 are arranged at suitable intervals within substantially the same radius from the slide 124 so that said lug 128 may engage any one of them when brought into proper position by revolving the button 123. As illustrated, the end of the slide 130 is arranged at the left hand side of the slide 124 and in the same horizontal plane therewith. The end of the slide 129 is arranged below the end of the slide 130 and slightly to the left of the vertical plane of the slide 124, while the end of the slide 131 is arranged in a similar position on the right hand side of said vertical plane. A fixed sleeve 132 is arranged around the shank 126, and is provided with slots or ways 133 see Figs. 20ª and 20ᵇ therein adapted to receive and guide the lug 128 during the reciprocation of the slide 124 and said shank. There are four of these slots, one located opposite each of the adjacent ends of the voting slides 129, 130 and 131, while the fourth one is arranged on the right hand side of the slide 124, and in the same horizontal plane with it. From this construction, it will be seen that if the button is turned so that the lug 128 will engage the last mentioned slot in the sleeve 132, the slide 124 may be pushed in without carrying any one of the other three voting slides with it, whereas, if said lug is brought to rest at a point opposite one of the other slides in said sleeve, it will carry the corresponding one of the other slides in with it when it is pushed in. Suitable indicia is arranged on the face of the machine, as at 134, in Fig. 1, corresponding to the slots in the sleeve so that the voter can determine by means thereof and the pointer 127 which of said slots the lug 128 will enter when he pushes in the button 123. A spring 135 connected to the slide 124 and the collar 125 normally holds the shank in position with its lug 128 opposite the slot in the sleeve which has no corresponding extra voting slide. This spring serves to automatically return the shank 126 to normal position as soon as said lug is released from one of the other slots in said sleeve.

Each of the voting slides 129, 130 and 131 has a notch 136, 137 and 138, respectively. See Fig. 20. The voting slide 124 has two laterally projecting pins 139 and 140 extending respectively into the notches 136 and 138 of the slides 129 and 131. The voting slide 129, as well as a projecting pin 141 extends into the notch 137 of the slide 130. Because of this arrangement of the notches and pins, it will be seen that when the slide 130 is pushed in, it will carry with it the slide 129 so that the three slides 124, 129 and 130 will all move in together, said slide 124 being pushed in, of course, each time the button 123 is reciprocated by reason of it being attached to the shank 126, as heretofore explained. The pins and notches also cause the return of any one or all of the three slides 129, 130 and 131, which may have been pushed in, when the slide 124 is returned to normal position by the cam 89ˣ on the registering slide 83ˣ engaging the lug 142 on said slide 124. Each of the voting slides 124, 129, 130 and 131 is also equipped with a beveled block 143 on its upper surface adapted to raise corresponding hammer-shaped dogs 146ˣ, 147ˣ, 148ˣ and 149ˣ into engagement with notches 145 in the registering slide 83ˣ, Figs. 20ª and 22. These dogs and notches are made substantially like the dogs 82 and notches 84, previously described. Each of said dogs is connected to a separate angular lever, by strips 144, the dog 146ˣ corresponding to the voting slide 124 being connected to the lever 146ᵇ, the dog 147ˣ corresponding to the voting slide 131 to the lever 147ᵇ, the dog 148ˣ corresponding to the voting slide 129 to the lever 148ᵇ, and the dog 149ˣ corresponding to the voting slide 130 to the lever 149ᵇ. Said levers are arranged substantially in vertical alinement, but the arms thereof, which are not connected to the dogs, vary in length from the arm 146ª of the lever 146 which is shortest to the arm 149ª of the lever 149 which is the longest. Each of these arms 146ª, 147ª, 148ª and 149ª carries upwardly projecting pins 150, 151, 152 and 153, respectively, which engage parallel slots 154, 155, 156 and 157, respectively, in one end of the register actuating rod 158. The rear ends of these slots are arranged in line with the axis of the pin-carrying arms of said levers so that the movement of any one of the dogs 144 from left to right with the registering slide 83ˣ will cause the corresponding lever to turn on its pivot and the pin carried thereby to move the rod 158 rearward without any lost motion between said pins and slots. It will be noted that because of the difference in the length of the pin-carrying arms 146ª, 147ª, 148ª and 149ª, see Fig. 23, of said levers, the movement of the rod 158 caused by the actuation of each will vary, the lever 146ª moving said rod the shortest distance, while the lever 149ª moves it the greatest distance. Said rod 158 is provided with a rack 159 meshing with a gear 160 on the shaft of the register 161, whereby the movement of the various dogs and levers will turn the register different degrees so as to count one and one-half votes when the voting slide 131 is pushed in operating the dogs attached to the levers 146ᵇ and 147ᵇ, one whole vote when the voting slide 124 is pushed in operating the lever 146ᵇ, two votes when the voting slide 129 is pushed in operating the levers 146ᵇ and 148ᵇ, and three votes when the voting slide 130 is pushed in operating the levers 146ᵇ and 149ᵇ. The rod 158 is returned to normal position by means of an angular lever 162, one arm of which has a slot at its end engaging a pin projecting downward to the registering slide 83ˣ, and its other arm adapted to engage a lug 163 on the slotted end of said rod 158, see Figs. 20 and 21.

When three vacancies are to be filled in the same office, as provided for in the cumulative voting section which I have illustrated, only one set of spacing blocks 164 is employed for the three horizontal rows of voting slides. This row of spacing blocks is preferably arranged on a level with the intermediate horizontal row of voting slides, and the voting slides in the other two rows are bent or crooked up or down to the level of said blocks, as clearly shown in Figs. 20 and 20ª. There will, therefore, be a group of twelve voting slides arranged just below the spacing blocks at the rear of each column of three push buttons on the face of the cumulative voting section. This group of twelve slides comprises three sets similar to that already described as consisting of the voting slides 124, 129, 130 and 131. There will then, of course, be three voting slides like the slide 131, which may be termed "one and one-half vote" slides, for, when actuated each of them will register one and one half votes. These "one and one-half votes" slides have wedges 165 which are just one-half the width of the wedges 166 carried by the other nine voting slides, so that two of the wedges 165 together with two of the wedges 166 acting in unison will have to be introduced between the spacing blocks in order to take up as much space between them as three of the wedges 166. The spacing blocks are so disposed that they admit of the introduction of any combination of the wedges 165 and 166 making a total equal to three of the wedges 166. In other words, three whole votes may be cast for the same nominee, or one and one-half votes cast for each of two nominees, or one whole vote for one nominee and two whole votes for another, or one vote for each of three nominees. Only the voting slide 124 and the others corresponding thereto in the cumulative voting section are connected to the "straight ticket" shafts 3, as illustrated in Fig. 20, because the voting of the "straight ticket" is designed to count one vote for each of the party nominees.

It will be understood that the mechanism for cumulative voting is not necessarily confined to three candidates but may be applied to any number. The peculiar arrangement of four voting slides when the greatest number of votes that can be cast is three, is designed especially to comply with a requirement of the laws of the State of Illinois, which provides that when three persons are to be elected to the legislature the voter must have the privilege of casting his three votes for one candidate, or two votes for one candidate and one for another, or one and one-half votes for each of two candidates, or one vote for each of three candidates.

Referring again to the register 10 see Figs. 5 and 14, for registering the number of voters, it will be observed that this register is placed on the top of the machine facing rearward so as to be in view of the judges of election and the waiting voters. This register is operated by the depending operating arm 9, Fig. 5, one end of which coöperates with any suitable mechanism (not shown) within the register 10 for manipulating the register wheels. The end of the arm 9 has a slot which engages the horizontally movable lever 7, which in turn is connected to the registering slide 6. Said operating arm 9 is actuated each time the door or barrier is opened and closed, it being remembered that said registering slide is reciprocated by the movement of the door or barrier. The lever 7 is supported by and pivoted to the bracket 8 so that it may have the required movement in a horizontal plane.

I claim:

1. In a voting machine, the combination, with a casing, of individual voting slides having notches therein, individual registers, register actuating devices having projecting pins, locking slides provided with blocks adapted to engage the notches in said voting slides and with hooks adapted to engage said pins on the register actuating devices and means to move said locking slides into and out of locking position.

2. In a voting machine, the combination, with individual voting slides having inclined steps on their upper faces, of individual registers, a register actuating slide arranged transversely above said voting slides and having notches in its under face normally arranged in vertical alinement with said voting slides, dogs arranged in alinement with said register actuating slide between it and said voting slides with their heads resting on said voting slides, said dogs adapted to be raised to bring them into engagement with said register actuating slide when their voting slides are operated by reason of the inclined step thereon, and means of connection between said dogs and registers whereby the latter are operated when the dogs engage the notches in said register actuating slide and are moved with said slide.

3. In a voting machine, the combination, with individual voting slides having inclined steps on their upper faces, of individual registers, a register actuating slide arranged transversely above said voting slides and having notches in its under face normally arranged in vertical alinement with said voting slides, dogs arranged in alinement with said register actuating slide between it and said voting slides with their heads resting on said voting slides, said dogs adapted to be raised to bring them into engagement with said register actuating slide when their voting slides are operated by reason of the inclined step thereon, register operating rods and intermediately pivoted levers having their ends connected to said rods and dogs for the purpose specified.

4. In a voting machine, the combination, with individual voting slides having inclined steps on their upper faces, of individual registers, a register actuating slide arranged transversely above said voting slides and having notches in its under face normally arranged in vertical alinement with said voting slides, dogs arranged in alinement with said register actuating slide between it and said voting slides with their heads resting on said voting slides, said dogs adapted to be raised to bring them into engagement with said register actuating slide when their voting slides are operated by reason of the inclined step thereon, means of connection between said dogs and registers whereby the latter are operated when the dogs engage the notches in said register actuating slide and are moved with said slide, and means for holding said dogs in engagement with said notches in the register actuating slide during the movement of the latter.

5. In a voting machine, the combination, with individual voting slides having inclined steps on their upper faces, of individual registers, a register actuating slide arranged transversely above said voting slides and having notches in its under face normally arranged in vertical alinement with said voting slides, dogs arranged in alinement with said register actuating slide between it and said voting slides, a strip arranged parallel to the register actuating slide below said dogs and having openings therein above the voting slides, the heads of said dogs having downwardly projecting portions normally extending through the openings in said strip and resting upon said voting slides, the heads of said dogs also having upward projections adapted to engage the notches in said register actuating slides when the voting slides are operated by reason of the inclined steps thereon, and means of connection between said dogs and registers whereby the latter are operated when the dogs engage the notches in said register actuating slide and are moved with said slide.

6. In a voting machine, the combination, with individual voting slides having inclined steps on their upper faces, of individual registers, a register actuating slide arranged transversely above said voting slides and having notches in its under face normally arranged in vertical alinement with said voting slides, dogs arranged in alinement with said register actuating slide between it and said voting slides, a strip arranged parallel to the register actuating slide below said dogs and having openings therein above the voting slides, the heads of said dogs having downwardly projecting portions normally extending through the opening in said strip and resting upon said voting slides, the heads of said dogs also having upward projections adapted to engage the notches in said register actuating slides when the voting slides are operated by reason of the inclined steps thereon, register operating rods, and intermediately pivoted levers having their ends connected to said dogs and rods for the purpose specified.

7. In a voting machine, the combination, with individual voting slides having inclined steps on their upper faces, of individual registers, a register actuating slide arranged transversely above said voting slides, means of connection between said registers and said register actuating slide which are brought into operative engagement by riding up said inclined steps of said voting slides when the latter are actuated, and means to lock said voting slides.

8. In a voting machine, the combination, with individual voting slides having notches therein and also provided with inclined steps on their upper faces, of individual registers, a register actuating slide arranged transversely above said voting slides, means of connection between the registers and the register actuating slide which are brought into operative engagement by riding up said inclined steps on said voting slides when the latter are actuated, and a locking slide carrying blocks adapted to engage the notches in said voting slides.

9. In a voting machine, the combination, with individual voting slides having notches therein and also provided with inclined steps on their upper faces, of individual registers, a register actuating slide arranged transversely above said voting slides, means of connection between the registers and the register actuating slide which are brought into operative engagement by riding up said inclined steps on said voting slides when the latter are actuated, and a locking slide carrying blocks adapted to engage the notches in said voting slides, said locking slide also having means for positively locking said registers.

10. In a voting machine, the combination, with individual voting slides having inclined steps on their upper faces, of individual registers, a register actuating slide arranged transversely above said voting slides, means of connection between said registers and said register actuating slide which are brought into operative engagement by riding up said inclined steps of said voting slides when the latter are actuated, means to lock said voting slides, and means to prevent the actuation of more voting slides of those corresponding to the several candidates for the same office than the number of officials to be elected to that office.

11. In a voting machine, the combination, with a casing having slots therein, of a strip of paper adapted to be fed across said slots, covers for said slots adapted to be moved so that access may be had to the paper through the slots for independent voting, regular voting devices, registers corresponding to said regular voting devices, means for actuating those registers whose voting devices have been operated, independent voting slides adapted to be operated when said covers are removed from the slots in the casing, an upright shaft having projections adapted to engage lugs on said independent voting slides, a slide carrying means for feeding the strip of paper, means of connection between said latter slide and said upright shaft, and means to actuate said last mentioned slide simultaneously with the actuation of the registers for the purposes specified.

12. In a voting machine, the combination, with a casing having slots therein, of a strip of paper adapted to be fed across said slots, covers for said slots adapted to be moved so that access may be had to the paper through the slots for independent voting, regular voting devices, registers corresponding to said regular voting devices, register actuating slides adapted to actuate those registers whose voting devices have been operated, independent voting slides adapted to be operated when said covers are removed from the slots in the casing, an upright shaft having projections adapted to engage lugs on said independent voting slides, a slide carrying means for feeding the strip of paper, means of connection between said latter slide and said upright shaft, and a lug on said last mentioned slide arranged in the path of a lug on one of said register actuating slides whereby the feeding of the strip of paper will take place simultaneously with the actuation of the registers.

13. In a voting machine, the combination, with regular voting devices, of registers corresponding thereto, two rolls, a strip of paper extending from one to the other and adapted for independent voting, a wheel provided with a serrated periphery and having connection with one of said rolls, a radial arm pivoted at the center of said wheel and carrying a pawl at its outer end, a projection on said arm, a slide having a slot therein engaging said projection, means to reciprocate said slide whereby said wheel and roll to which it is connected are revolved simultaneously with the actuation of the registers, and means to automatically regulate the distance said wheel is revolved to compensate for the gradual increase in diameter of said last mentioned roll as the paper is wound thereon.

14. In a voting machine, the combination, with a casing, of a hinged front section having a slot therein, a strip of paper arranged within said slot for independent voting, a cover for said slot, regular voting devices, and means for locking said regular voting devices when said cover is removed from the slot comprising mechanism mounted on said hinged front section adapted to automatically and removably engage mechanism carried by another part of the casing whereby said hinged front section may be opened for the purpose specified.

15. In a voting machine, the combination, with a casing, of a hinged front section having a slot therein, a strip of paper arranged within said slot for independent voting, a cover for said slot, a rod secured to said cover and extending near to the free edge of said hinged section, a hook on the end of said rod, regular voting devices and means for locking said regular voting devices when the cover is removed from said slot comprising mechanism adapted to be automatically and removably engaged by the hook on the end of said rod, whereby said hinged front section may be opened for the purpose specified.

16. In a voting machine, cumulative voting mechanism comprising a group of voting slides, of a single push button adapted to be rotated and carrying a radial projection which is capable of engaging any one of the voting slides in said group for actuating it when said push button is pressed, and means of connection between one of said voting slides and another whereby the actuation of the first will carry the second with it, but the actuation of the second will not affect the first.

17. In a voting machine, cumulative voting mechanism comprising a group of voting slides, a push button swiveled on the end of one of said slides and having a radial projection adapted to engage the ends of the other slides, and means of connection between the several slides of said group, whereby the return of the one on which the push button is mounted after it has been actuated will automatically return all of the other voting slides which have been actuated.

18. In a voting machine, cumulative voting mechanism comprising a group of voting slides, a push button swiveled on the end of one of said slides and carrying a radial projection adapted to engage any of the other voting slides, the normal position of said projection being out of engagement with any of said voting slides so that the actuation of said button will then only carry with it the slide on which it is swiveled, and means for automatically rotating said push button to return its radial projection to normal position when released.

19. In a voting machine, cumulative voting mechanism comprising a group of voting slides, a push button swiveled on the end of one of said slides and carrying a radial projection adapted to engage any of the other voting slides, the normal position of said projection being out of engagement with any of said voting slides so that the actuation of said button will then only carry with it the slide on which it is swiveled, and a coiled spring connected to said push button and the slide on which it is swiveled, whereby the former is automatically rotated to return its radial projection to normal position when released.

20. In a voting machine, cumulative voting mechanism comprising a group of voting slides, a push button swiveled on the end of one of said slides and carrying a radial projection adapted to engage any of the other slides, and a collar mounted around the shank of said push button and having ways to guide said lateral projection for the purpose specified, said projection being normally arranged opposite a way in said collar which has no corresponding voting slide whereby only the voting slide to which the push button is swiveled will be actuated when said push button is pressed in that position, and means for automatically rotating said push button to return its projection to normal position when it is released from one of the ways in the collar corresponding to the other voting slides.

21. In a voting machine, cumulative voting mechanism comprising a plurality of groups of voting slides, of rotatable push buttons, one for each group of slides, a radial projection on each of said push buttons adapted to engage the slides in its group, a row of sliding blocks, into the plane of which the inner extremities of all of the voting slides of the several groups are bent, and wedges mounted on said ends of the voting slides and adapted to enter between said blocks for the purpose specified.

22. In a voting machine, cumulative voting mechanism comprising a plurality of groups of voting slides, of rotatable push buttons, one for each group of slides, a radial projection on each of said push buttons adapted to engage the slides in its group, a row of sliding blocks, into the plane of which the inner extremities of all of the voting slides of the several groups are bent, and wedges mounted on said ends of the voting slides and adapted to enter between said blocks, certain of said wedges being narrower than others for the purpose specified.

23. In a voting machine, cumulative voting mechanism comprising a plurality of groups of voting slides, of rotatable push buttons, one for each group of slides, a radial projection on each of said push buttons adapted to engage the slides in its group, a row of sliding blocks, into the plane of which the inner extremities of all of the voting slides of the several groups are bent, and wedges mounted on said ends of the voting slides and adapted to enter between said blocks, certain of said wedges being one-half as wide as others for the purpose specified.

24. In a voting machine, the combination, with individual voting slides having inclined steps on their upper faces, of independent voting slides, individual registers, a register actuating slide arranged transversely above said voting slides, means of connection between said registers and said register actuating slide which are brought into operative engagement by riding up said inclined steps of said voting slides when the latter are actuated, and means of locking said voting slides.

25. In a voting machine, the combination, with individual voting slides having notches therein and also provided with inclined steps on their upper faces, of independent voting slides, individual registers, a registering actuating slide arranged transversely above said voting slides, means of connection between the registers and the register actuating slide which are brought into operative engagement by riding up said inclined steps on said voting slides when the latter are actuated, and a locking slide carrying blocks adapted to engage the notches in said voting slides.

26. In a voting machine, the combination, with individual voting slides having inclined steps on their upper faces, of independent voting slides, of individual registers, a register actuating slide arranged transversely above said voting slides, means of connection between said registers and said register actuating slide which are brought into operative engagement by riding up said inclined steps of said voting slides when the latter are actuated, means to lock said voting slides, and means to prevent the actuation of more voting slides of those corresponding to the several candidates for the same office than the number of officials to be elected to that office.

27. In a voting machine, the combination, with individual voting slides, of independent voting slides, individual registers, register actuating slides arranged transversely of said voting slides, obstructions on said register actuating slides, and hooks on said independent voting slides adapted to engage said obstructions when said slides are pushed in whereby they are locked against being withdrawn until after the operation of said register actuating slides.

28. A voting machine comprising a casing, a "straight-ticket" voting device, a plurality of removable individual voting sections, individual voting devices carried by said sections, vote registers, means for actuating said registers, a locking device, means for actuating said locking device, means whereby said locking device is automatically engaged by its actuating means when the voting sections are placed in the casing, and means for locking all the voting mechanism, including the "straight-ticket" voting devices, the individual voting devices and register actuating means by one and the same movement.

29. In a voting machine, the combination, with a casing, of individual voting devices arranged in horizontal rows therein, means to actuate said devices, means to return said devices to initial position after actuation, locking slides, each adapted to lock all of the voting devices in each row independently of the actuation of the voting devices, a vertical rod connecting all of said slides, and means extending through the casing into view of the waiting voters for moving said rod whereby said slides are reciprocated into and out of locking position, as desired.

30. In a voting machine, the combination, with a casing, of individual voting devices arranged in horizontal rows therein, means to actuate said devices, means to return said devices to initial position after actuation, locking slides adapted to lock all of the voting devices in each row independently of the actuation of the voting devices, other locking slides arranged to lock the voting devices in only some of said rows, and separate means for reciprocating the first mentioned and last mentioned locking slides for the purposes specified.

31. In a voting machine, the combination, with upright "straight-ticket" shafts, of hooks pivotally connected thereto, "straight-ticket" slides operatively connected to said shafts, individual voting slides, hooks pivotally mounted on said individual voting slides and adapted to normally engage the hooks connected to said upright shafts, a stationary bar arranged transversely of said voting slides and pins mounted on said bar and engaging obliquely arranged slots in the hooks mounted on said individual voting slides, an axially movable slide arranged transversely of said voting slides and means of connection between said last named slide and the "straight-ticket" hooks, whereby all the other "straight-ticket" hooks may be moved out of connection with their individual voting hooks when one of the voting devices is actuated.

32. In a voting machine, the combination, with "straight-ticket" shafts, "straight-ticket" slides and hooks pivotally connected to said shafts, of individual voting slides having means of connection with said "straight-ticket" hooks, said means employing hooks, the longitudinal axis of which is in alinement with the longitudinal axis of the hooks of the voting slides, and independent voting device, an independent voting slide connected thereto, a movable bar arranged transversely of said voting slides, pins on the "straight-ticket" hooks engaging slots in said bar, and a pin on the independent voting slide engaging a triangular slot in said bar for the purpose specified.

33. In a voting machine, the combination, with a casing, "straight-ticket" shafts, "straight-ticket" slides and hooks connected to said shafts all mounted in said casing, of an independent voting device also mounted in said casing, a removable section, individual voting slides, and an independent voting slide mounted in said removable section, means of connection between said individual voting slides and the "straight-ticket" hooks, means of connection between said independent voting device and independent voting slide, and means of connection between said independent voting slide and said "straight-ticket" hooks, whereby the actuation of said independent voting slide will disconnect said hooks from all of the individual voting slides in the same group.

34. In a voting machine, the combination, with a casing, "straight-ticket" shafts, "straight-ticket" slides and hooks connected to said shafts, all mounted in said casing, of an independent voting device also mounted in said casing, a removable section, individual voting slides, and an independent voting slide mounted in said removable section, means of connection between said independent voting device and independent voting slide, a bar mounted in said removable section transversely to said voting slides, pins on the "straight-ticket" hooks engaging open-ended slots in said bar, and a pin on the independent voting slide engaging an obliquely arranged slot in said bar for the purpose specified.

35. In a voting machine, the combination, with a casing, of a series of removable drawer-like sections, voting devices, registers and a register actuating slide mounted in each of said sections, a slide mounted permanently in said casing, a slotted member secured to said latter slide and hooks on the ends of said register actuating slides adapted to automatically engage said slotted member when said sections are placed in the casing for the purpose specified.

36. In a voting machine, the combination, with a casing, of a barrier, two slides permanently mounted in said casing and connected to said barrier whereby they will be reciprocated when said barrier is opened and closed, a slotted member connected at its ends to said slides, a plurality of removable drawer-like sections, voting devices, registers and a register actuating slide mounted in each of said sections, and hooks formed on the ends of said register acutating slides adapted to be automatically brought into operative engagement with said slotted member when said sections are placed in the casing.

37. In a voting machine, cumulative voting mechanism comprising a group of voting slides means for moving said voting slides into position for registering either one, one and one-half, two or three votes for the same candidate, a register having a pinion on its shaft, a rack bar meshing with said pinion, a register actuating device and means of connection between said rack bar and register actuating device and between the latter and said voting slides, whereby the throw of said rack bar is varied so as to register a vote corresponding to the voting slides which have been actuated.

38. In a voting machine, cumulative voting mechanism comprising a group of voting slides, a rotatable push button adapted to move said voting slides into position for registering either one, one and one-half, two or three votes for the candidate represented by said push button, a register having a pinion on its shaft, a rack bar meshing with said pinion, a register actuating device and means of connection between said rack bar and register actuating device and between the latter and said voting slides whereby the throw of said rack bar is varied so as to register a vote corresponding to the voting slides which have been actuated.

39. In a voting machine, cumulative voting mechanism comprising a group of voting slides, means for moving said voting slides into position for registering either one, one and one-half, two or three votes for the same candidate, a register having a pinion on its shaft, a rack bar meshing with said pinion, a register actuating slide, levers corresponding to the voting slides and adapted to be engaged with said register actuating slide to move with it, means of connection between said levers and said rack bar whereby the actuation of the latter by one of the said levers will not move another lever out of its normal position, and means for moving said register actuating slide, whereby the throw of the rack bar is varied so as to register a vote corresponding to the voting slides which have been actuated.

40. In a voting machine, cumulative voting mechanism comprising a group of voting slides, means for moving said voting slides into position for registering either one, one and one-half, two or three votes for the same candidate, a register having a pinion on its shaft, a rack bar meshing with said pinion, a register actuating slide, levers corresponding to the voting slides and adapted to be engaged with said register actuating slide to move with it, said levers having corresponding arms of different lengths, and means of connection between said arms and said rack bar whereby the actuation of the latter by one of the said levers will not move another lever and the throw of said rack bar will be varied so as to register a vote corresponding to the voting slides which have been actuated.

41. In a voting machine, cumulative voting mechanism comprising a group of voting slides, means for moving said voting slides into position for registering either one, one and one-half, two or three votes for the same candidate, the register having a pinion on its shaft, a rack bar meshing with said pinion, a register actuating slide, levers corresponding to the voting slides and adapted to be engaged with said register actuating slide to move with it, means of connection between said levers and said rack bar whereby the actuation of the latter by one of the said bars will not move another lever out of its normal position, means connected to said register actuating slide and adapted to engage the said rack bar for returning it to normal position, and means for moving said register actuating slide, whereby the throw of the rack bar is so varied as to register a vote corresponding to the voting slides which have been actuated.

42. In a voting machine, cumulative voting mechanism comprising a group of voting slides, means for moving said voting slides into position for registering either one, one and one-half, two or three votes for the same candidate, a register having a pinion on its shaft, a rack bar meshing with said pinion, a register actuating slide, levers corresponding to the voting slides and adapted to be engaged with said register actuating slide to move with it, means of connection between said levers and said rack bar whereby the actuation of the latter by one of said levers will not move another lever out of its normal position, another lever connected to said register actuating slide and adapted to engage said rack bar for returning it to normal position, and means for moving said register actuating slide, whereby the throw of the rack bar is varied so as to register a vote corresponding to the voting slides which have been actuated.

43. In a voting machine, cumulative voting mechanism comprising a group of voting slides, means for moving said voting slides into position for registering either one, one and one-half, two or three votes for the same candidate, a register having a pinion on its shaft, a rack bar meshing with said pinion and having a plurality of longitudinal slots therein, a register actuating slide, levers corresponding to the voting slides and adapted to be engaged with said register actuating slide to move with it, pins on said levers extending into the slots in said rack bar, and means for moving said register actuating slide, whereby the throw of the rack bar is varied so as to register a vote corresponding to the voting slides which have been actuated.

44. In a voting machine, cumulative voting mechanism comprising a group of voting slides, means for moving said voting slides in position for registering either one, one and one-half, two or three votes for the same candidate, a register having a pinion on its shaft, a rack bar meshing with said pinion and having a plurality of longitudinal slots therein, a register actuating slide, levers corresponding to the voting slides and adapted to be engaged with said register actuating slide to move with it, pins on said levers extending into the slots in said rack bar, another lever connected to said register actuating slide and engaging a projecting pin on said rack bar for returning the latter to normal position, and means for moving said register actuating slide whereby the throw of the rack bar is varied so as to register a vote corresponding to the voting slides which have been actuated.

45. In a voting machine, cumulative voting mechanism comprising a group of voting slides, means for moving said voting slides into position for registering either one, one and one-half, two or three votes for the same candidate, a register having a pinion on its shaft, a rack bar meshing with said pinion and having a plurality of longitudinal slots therein, a register actuating slide, levers corresponding to the voting slides and adapted to be engaged with said register actuating slide to move with it, said levers being intermediately pivoted on the same axis and having arms of different lengths, and pins on the ends of said arms engaging the slots in said rack bar, whereby the throw of the latter is varied so as to register a vote corresponding to the voting slides which have been actuated.

46. In a voting machine, the combination, with "straight-ticket" voting devices, of individual voting devices normally interlocked with said "straight-ticket" voting devices and arranged in groups corresponding to each office to be filled, locking slides adapted to secure certain of said groups of voting devices against being actuated, and means for automatically disconnecting such groups of voting devices from the "straight-ticket" voting devices when said locking slides are moved into locking position.

47. In a voting machine, the combination, with "straight-ticket" voting devices, of individual voting devices normally interlocked with said "straight-ticket" voting devices and independent voting devices arranged in groups corresponding to each office to be filled, devices for limiting the number of votes cast for each office, locking slides adapted to secure certain of said groups of voting devices against being actuated, means for automatically disengaging all the individual voting devices in a group from the "straight-ticket" voting devices when the independent voting device in said group is actuated, and means for automatically disconnecting a whole group of voting devices from the "straight-ticket" voting devices when the corresponding locking bar is moved into locking position.

48. A voting machine, comprising a casing, a "straight-ticket" actuating mechanism, a plurality of removable individual voting sections, individual voting mechanisms contained therein, means whereby the said individual voting mechanisms are automatically engaged by the "straight-ticket" voting-mechanism when said individual voting sections are in place in the casing.

49. A voting machine comprising a casing, a "straight-ticket" actuating mechanism, a locking device for special voting, means for actuating said locking device, a plurality of individual sections, individual voting mechanisms contained therein, means whereby said locking device is automatically engaged with its actuating means when the individual voting sections are placed in the casing.

50. In a voting machine, the combination, with a casing having a slot therein, of a strip of paper arranged across said slot for independent voting, a cover for said slot, an independent voting slide movable longitudinally in said casing and having its end projecting therefrom, means of connection between said independent voting slide and said cover whereby the movement of the former will withdraw the latter from said slot, regular voting devices, registers corresponding to said regular voting devices and to said independent voting slides, and means to actuate said registers for indicating the vote cast.

In testimony whereof, I affix my signature, in presence of two witnesses.

JOHN M. HAYES.

Witnesses:
GALA M. BENNETT,
W. J. SMITHGALL.

---

Copies of this patent may be obtained for five cents each, by addressing the "Commissioner of Patents, Washington, D. C."